United States Patent [19]

Mayer et al.

[11] 4,359,162
[45] Nov. 16, 1982

[54] DEVICE FOR STACKING BOARD-STAPED ARTICLES

[75] Inventors: Karl Mayer, Radolfzell; Erich Luther; Martin Maelzer, both of Hagenburger Strasse 26, Wunstorf, all of Fed. Rep. of Germany

[73] Assignees: Erich Luther; Martin Maelzer, both of Wunstorf, Fed. Rep. of Germany

[21] Appl. No.: 184,160

[22] Filed: Sep. 4, 1980

[30] Foreign Application Priority Data

Sep. 18, 1979 [DE] Fed. Rep. of Germany ....... 2937691

[51] Int. Cl.³ .................... A47G 19/08; A47F 5/12
[52] U.S. Cl. .................................. 211/41; 312/50; 312/320; 312/351; 108/2
[58] Field of Search ................ 312/50, 351, 117, 14, 312/15, 17, 320; 211/41, 133, 187; 108/2

[56] References Cited

U.S. PATENT DOCUMENTS

| 2,539,700 | 1/1951 | Pieper | 108/2 |
| 2,716,495 | 8/1955 | Prevette et al. | 108/2 |
| 2,768,048 | 10/1956 | Schumacher | 312/351 |
| 2,928,551 | 3/1960 | Abrams et al. | 108/2 |
| 2,950,820 | 8/1960 | Shiels | 108/2 |
| 2,982,419 | 5/1961 | Shiels | 108/2 |
| 2,986,281 | 5/1961 | Jordan | 211/41 |
| 2,998,672 | 9/1961 | Sautereau | 108/2 |
| 3,151,576 | 10/1964 | Patterson | 108/2 |
| 3,161,158 | 12/1964 | Lurey | 108/2 |
| 3,217,667 | 11/1965 | Patterson | 108/2 |

Primary Examiner—Victor N. Sakran
Attorney, Agent, or Firm—Fitzpatrick, Cella, Harper & Scinto

[57] ABSTRACT

Board-shaped articles are to be stacked in a frame in such a way that they can be introduced into the frame from the same elevation, means being provided to ensure the maintenance of the desired spacing between the individual articles. To that end the spacing elements are supported in the frame in such a manner as to be deflectable and the articles during insertion deflect the spacing elements in the loading direction. The spacing element which is closest to an article already inserted comes into contact with such article.

11 Claims, 5 Drawing Figures

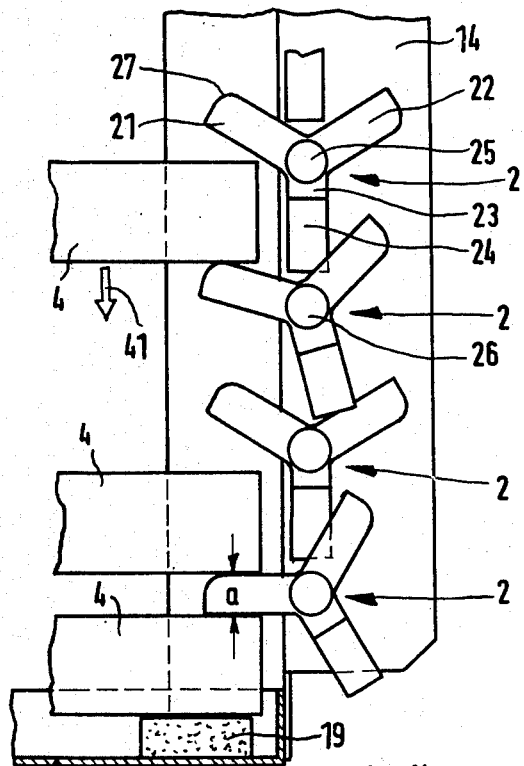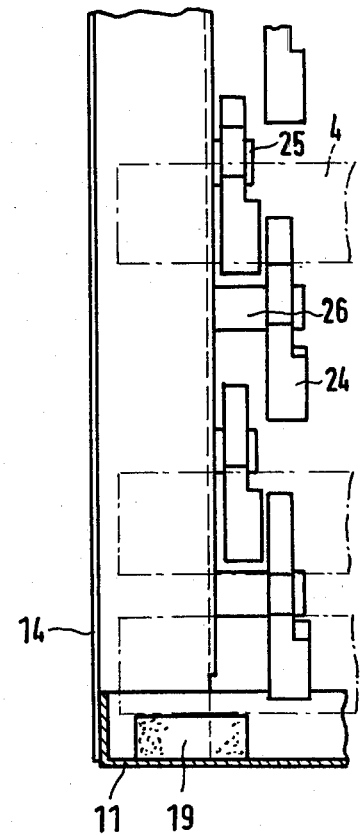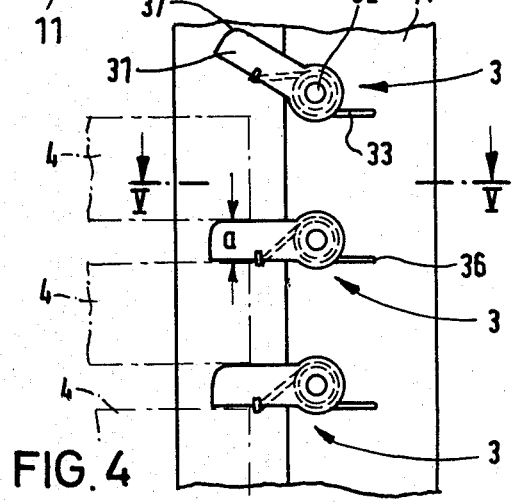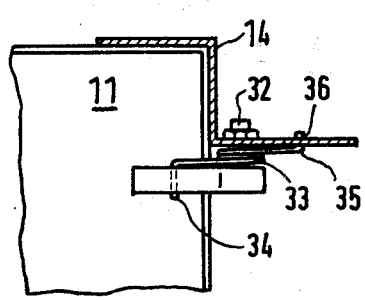

DEVICE FOR STACKING BOARD-STAPED ARTICLES

BACKGROUND OF THE INVENTION

1 Field of the Invention

The invention relates to a device which is adapted to stack board- or card-shaped articles, said device comprising a frame into which the articles may be introduced in a loading direction and spacer elements disposed between adjacent articles in the frame.

2. Prior Art

It is frequently necessary to stack board-like articles in a mutually spaced relation. For example, in the case of printed-circuit boards not yet subjected to a soldering operation but already fitted with circuit elements it is necessary to maintain spaces between said boards so that the circuit elements inserted in the boards will not be raised out of their associated holes upon a given board being placed on another board disposed therebelow. A similar problem arises with boards which are provided with a coating, for example, a paint coat or the like, and with which it is required to prevent mutual contact before the drying operation is completed.

Thus far it has been customary with board-shaped articles of this type, particularly pre-assembled printed-circuit boards, to insert such articles into shelves having individual compartments. It is also possible to slide the pre-assembled boards in a lateral direction into shelves provided with slots or to fit the articles into such slots. Besides, it is possible to stack such boards one above the other by disposing spacers between adjacent boards.

A disadvantage of the devices hitherto employed resides in the fact that both the inserting or loading operation and removal of the articles, particularly where separate spacers are used, require a considerable expenditure of manual labor, it being additionally necessary to employ a certain amount of care.

Such devices are not suitable for use in conjunction with mechanical gripping and transfer devices which are employed to an ever increasing extent in the automatic manufacture, particularly of electronic equipment. It is particularly difficult, during loading of the device, to operate the gripping device in such a manner that the stacking space to be used next should be disposed at a predetermined elevation and to provide for adjacent board-shaped articles to be inserted in such a manner that the prescribed spacing is maintained.

OBJECT OF THE INVENTION

It is an object of the invention to provide a device of the type mentioned in the introduction which is constructed in such a manner that loading of the device with board-shaped articles is possible at a definite elevation, means being provided to ensure the maintenance of the desired spacing between the individual articles.

SUMMARY OF THE INVENTION

According to the invention, this object is attained by the characterizing features of claim 1. The invention is developed further by the features of the sub-claims.

It is an essential feature of the invention that pivotally movable spacing elements extend into the stacking space of the frame. During the loading operation, these pivotally movable spacing elements are sequentially displaced by the board-shaped articles which are introduced into the frame in a loading direction so that they will not impede the loading operation as long as no board-shaped article already stacked is present in the loading direction directly behind (or, with vertical loading, directly below) the respective spacing element. This article which constitutes the uppermost article in the partial stack already formed is an obstacle which prevents deflection of the spacing element by the next following article. The spacing element engages this article, and the next article is then spaced from this article by a dimension determined by the spacing element.

The spacing elements are preferably provided with restoring means serving to ensure that the spacing elements, after having been deflected, are automatically returned to their inoperative position which they assumed before deflection so that equal spaces can be maintained with all articles.

The restoring means may be gravity-operated or may be constituted by spring elements.

The invention can be employed to stack board-shaped articles with a vertical or horizontal or any other loading direction.

BRIEF DESCRIPTION OF THE DRAWINGS

The invention may be carried into practice in a number of ways but certain specific embodiments will now be described by way of example with reference to the accompanying drawings, in which:

FIG. 2 shows spacing elements in accordance with the elevation II—II in FIG. 1.

FIG. 3 is a side elevation of the spacing elements of FIG. 2.

FIG. 4 is an elevation resembling FIG. 2 showing spacing elements according to another embodiment of the invention.

FIG. 5 shows the cross-section V—V in FIG. 4.

DETAILED DESCRIPTION OF PREFERRED EMBODIMENTS

Figure 1:
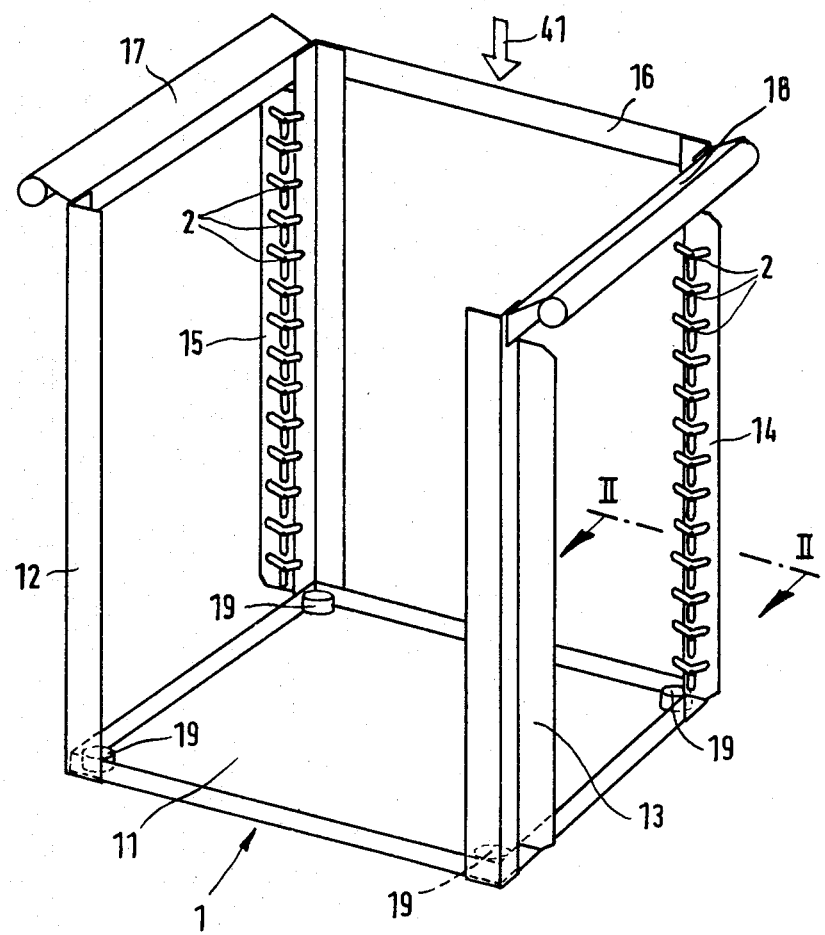
FIG. 1 is a perspective representation of a frame comprising spacing elements represented diagrammatically for explaining the invention.

The invention is explained by describing a device for stacking and transporting pre-assembled printed-circuit boards.

The device comprises a frame 1 having a bottom member 11 having attached thereto buffers 19 whose height at corresponds to the minimum spacing to be maintained between the bottom member 11 and a board-shaped article to be inserted. Provided at the four corners of the bottom member 11 are upwardly extending angular guide members 12, 13, 14 and 15. At their upper ends, the angular guide members 12 to 15 are interconnected by bracing rails 16 and/or guide and handling rails 17 and 18. Bracing of the frame thus formed may also be effected in any desired other manner.

As shown in detail in FIGS. 2 and 3, each of the angular guide members 12 to 15 is provided with regularly spaced spacing elements 2 which are pivotally mounted.

The spacing elements 2 are of symmetrical shape and each include three wings with one wing 21 extending into the stacking space, a second wing 22 extending out of the frame and a third wing 23 extending vertically downwards in the inoperative position. This wing 23 is provided with a weight which, in the embodiment shown, is constituted by a thickened portion 24, the spacing element 2 thus being maintained by gravity in a predetermined inoperative position. The three wings 21, 22 and 23 are spaced apart 120° and capable of being rotated about an axis 25 or 26, respectively.

The symmetrical shape of the spacing element 2 with its three wings ensures a particularly rapid, low-oscillation alignment, i.e. restoration of the spacing element 2 after a printed-circuit board 4 has moved therepast in the loading direction 41.

The width of at least the wing 21 of the spacing element 2 which extends into the stacking space defined by the angular guide members 12 to 15 is so selected that this width a corresponds at least to the desired minimum spacing between adjacent printed-circuit boards 4. As shown in FIGS. 4 and 5, the spacing element 3 may also be formed with a single wing. The single wing 31 of the spacing element 3 is biased into its inoperative position by a spring 33. For this purpose, one end 35 of the restoring spring engages in a hole 36 of the respective one of the angular guide members 12 to 15, with the other end 34 of spring 33 engaging the wing 31 in such a manner that the wing 31 is restored about the axis 32 in opposition to the direction 41, in which the printed-circuit boards 4 are introduced. The spring force of spring 33 is so selected that the wing 31, while being deflectable in the loading direction 41 by the weight of a printed-circuit board 4, will be reliably pivoted back into its inoperative position if it is not subjected to a load. Also in this embodiment, that surface 37 of the wing 31 which is struck by a printed-circuit board 4 during the loading operation is rounded off. This embodiment ensures restoration of the spacing element 3 into a definite inoperative position regardless of the direction of loading.

Where the stacking dimension which is defined by the width a of the wing 21 or 31 and the thickness of the printed-circuit board is smaller than the sum of the length of the wing 22 and that of the wing 23 or the length of the wing 31, the spacing elements 2 and 3 may be disposed in a plurality of planes extending parallel to the loading direction 41 as indicated in FIG. 3 by axles 25 and 26 disposed at different elevations. The lengths of the wings may differ in different planes, this permitting the attainment of a high packing density.

In the embodiment shown in FIG. 1, the printed-circuit boards are introduced into the frame 1 from above in such a manner that they are dropped or released by holding means in a plane which is located between the plane defined by the rails 16 to 18 or above this plane. Under these conditions, the printed-circuit boards 4 will then automatically move downwardly in the loading direction 41 and will deflect spacing elements 2 or 3 as shown in FIG. 2 for the second spacing element 2 from above. This will automatically ensure the maintenance of the proper spacing.

The printed-circuit boards 4 forming a stack may be removed again from the frame 1 in an upward direction. However, they may also be removed from the frame by inclining the frame. Thus it is not necessary to raise the printed-circuit boards 4 in a horizontal position in the frame 1 until the upper end of the frame is reached.

It is also possible to replace the bottom member 11 by a frame and to provide latching retaining elements instead of the buffers 19, this making it possible to remove the stacked printed-circuit boards 4 individually in a downward direction in the loading direction 41, with the spacing being maintained by automatic mechanical means. By suitably constructing the respective angular guide members it is also possible to permit the printed-circuit boards to be withdrawn in a lateral direction.

Finally it is also possible to provide the spacing elements 2 and 3 on supporting elements which are separated from the angular guide members 12 to 15 with such supporting elements being attached to the frame. By interchanging supporting elements provided with spacing elements 2 and 3 arranged at different spacings, the device may be quickly adapted to different stacking heights and densities.

In an exemplary application, pre-assembled but not soldered printed-circuit boards are first tested automatically, whereupon printed-circuit boards shown by the testing device to be satisfactory or unsatisfactory are moved into the loading position above the frame and then released by pneumatic gripping elements, the printed-circuit boards thus separated being successively stacked in the desired spacing.

Finally it will be understood that the invention is, of course, not limited to a device for stacking substantially rectangular, board-shaped articles but that such articles may have any other desired shape. In the case of board-shaped articles differing from the rectangular shape, it is only necessary to provide the guide members or supporting elements, respectively, for the spacing elements 2 and 3 in a position which is determined by the shape of the articles.

I claim:

1. A device for stacking board-shaped articles including a frame having a stacking space into which the articles are insertable in a loading direction and including spacing elements disposed between adjacent articles in the frame, characterized in that the spacing elements are supported in an inoperative position extending into said stacking space and in the frame to be deflectable from said inoperative position by said articles during insertion thereof into said stacking space so as not to impede their loading except where an article already loaded is present directly beyond a respective spacer element in the loading direction.

2. The device of claim 1, characterized in that the spacing elements are provided with restoring means adapted to restore them to said inoperative position.

3. The device of claim 2, characterized in that the restoring means are constructed in such a manner that the spacing elements are adapted to be restored into their inoperative positions by gravity.

4. The device of claim 1, characterized in that the spacing elements are of symmetrical three-winged shape and adapted to be pivoted about the axis of symmetry, and that the width a of the wings at least corresponds to the predetermined minimum distance between adjacent articles.

5. The device of claim 4, characterized in that, with loading in a vertical direction, the wing extending vertically downward in its inoperative position is heavier than the remaining wings.

6. The device of claim 5, characterized in that the wing which extends vertically downward is of greater thickness than the remaining wings.

7. The device of claim 2, characterized in that the restoring means is constituted by a restoring spring attached to the frame, which spring engages the spacing element, the spring force being such that the spacing element is at least deflectable by the weight of an article.

8. The device of claim 7, characterized in that the spacing element comprises a wing adapted to be pivoted about an axis, the restoring spring being adapted to engage the wing in order to positively cause motion in opposition to the loading direction, the width a of the wing at least corresponding to the predetermined minimum distance between adjacent articles.

9. The device of claim 1, characterized in that the spacing elements are disposed on the frame in a plurality of planes extending parallel to the loading direction.

10. The device of claim 1, characterized in that equal spaces are provided between the spacing elements.

11. The device of claim 1, characterized in that the faces of the spacing elements facing the direction of loading are rounded off.

* * * * *